United States Patent [19]

Butler

[11] 4,228,731
[45] Oct. 21, 1980

[54] PIE CRUST SHAPER

[76] Inventor: Irene Butler, 5652 Serene Dr., Huntington Beach, Calif. 92649

[21] Appl. No.: 15,189

[22] Filed: Feb. 26, 1979

[51] Int. Cl.² .............................................. A47J 37/00
[52] U.S. Cl. .............................. 99/433; 99/DIG. 15; D7/129
[58] Field of Search ................. 99/433, DIG. 15, 439; D7/129, 43; 425/290, 458; 426/496, 503, 512

[56] References Cited
U.S. PATENT DOCUMENTS

| | | | |
|---|---|---|---|
| 1,411,128 | 3/1922 | Strobhart | 99/433 |
| 1,596,331 | 8/1926 | Bassett | 99/DIG. 15 |
| 2,506,928 | 5/1950 | Klingbiel | 99/433 |
| 2,595,684 | 5/1952 | Lyons | 99/433 |
| 3,453,948 | 7/1969 | Murphy | 99/433 |

Primary Examiner—Billy J. Wilhite
Attorney, Agent, or Firm—George F. Bethel; Patience K. Bethel

[57] ABSTRACT

A pie crust shaper for a bottom pie crust comprising a flat, integrally formed open bottom section having a central area from which a plurality of radial spokes extend outwardly to a concentric circumferential band. Around the circumferential band are rotatably fastened a plurality of flat, substantially A-shaped flaps. The pie crust shaper is provided with a plurality of punched out pricking elements where it contacts a pie crust, as well as a central ring for purposes of handling the pie crust shaper. The device can be formed of metal, or of other materials such as plastic which are transparent to microwave radiation.

11 Claims, 9 Drawing Figures

U.S. Patent  Oct. 21, 1980  4,228,731
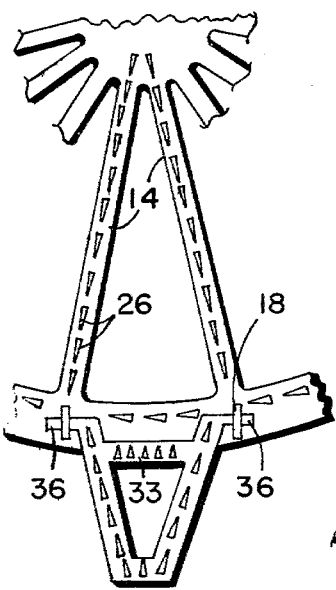
FIG. 7
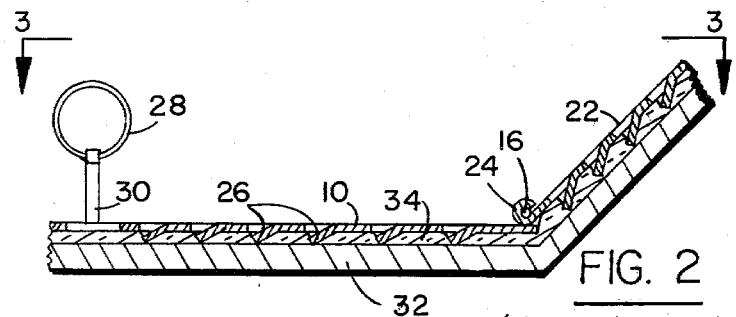
FIG. 2
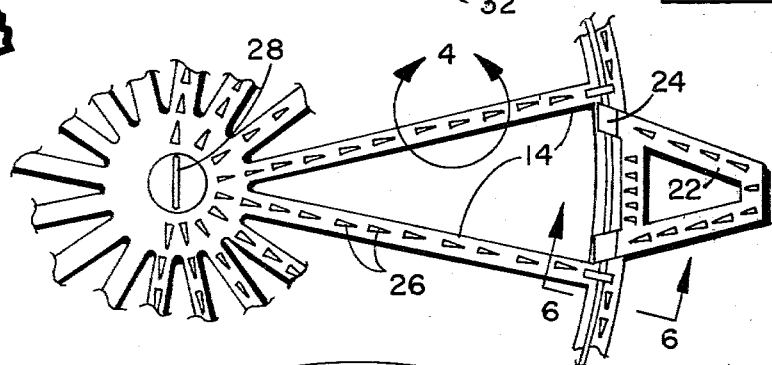
FIG. 3
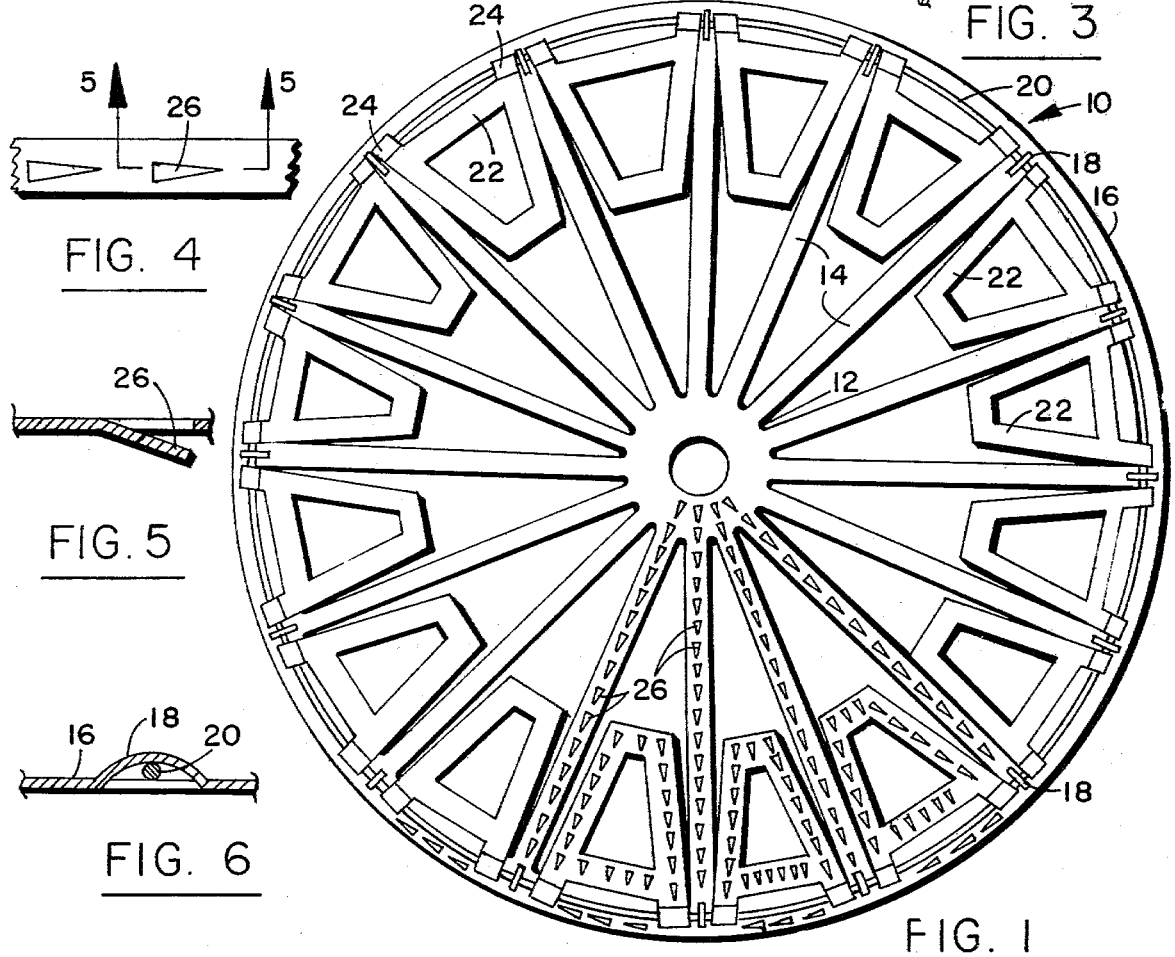
FIG. 4
FIG. 5
FIG. 6
FIG. 1

PIE CRUST SHAPER

FIELD OF THE INVENTION

This invention relates to the field of cooking utensils and particularly to a pie crust shaper for a bottom pie crust which utilizes an open network structure, together with pricking elements for the pie crust.

BACKGROUND OF THE INVENTION

The preparation of one crust pies often requires pre-baking of the bottom pie crust, prior to the addition of the pie fillings. The purpose of this is to avoid a soggy crust condition which can result when certain types of pie fillings are added to a pie crust prior to cooking. In other instances, the pie fillings are cooked before placing in the pie crust requiring the crust to be pre-baked.

It is not a simple matter to produce a uniform pie crust simply by rolling out the pie dough, followed by pressing against the bottom and walls of a standard pie tin. During the process of baking the pie, moisture is released from the pie crust dough, causing the pie crust to bubble or blister outwardly from the walls of the pie tin. This is a problem regardless of the type of pie tin used. For example, a pie tin made of ceramic, glass or metal, does not alleviate the problem.

In an effort to overcome blistering and warping of a single pie crust, cooks have resorted to filling the uncooked pie crust dough with an inert material, such as uncooked rice or beans to weigh the pie crust down. However, it has been found that if sufficient rice or beans are used, the moisture exuding from the pie dough during the baking process is not readily released, resulting in soggy areas in the pie crust. At the same time, the uncooked rice or beans which are used are destroyed in the process, causing considerable expense and waste.

The use of a pie tin of the same size used for the crust which is nested inside of the pie crust has also been tired. This has proved unsatisfactory also for the same reason that the rice has been unsatisfactory. That is, moisture is unable to escape.

In an effort to overcome the above moisture problems, nesting devices were tried having a generally pie-shaped configuration which were perforated with many holes, such as described in U.S. Pat. No. 1,596,331. Another device utilizing a slightly different configuration with a solid side wall is described in U.S. Pat. No. 1,411,128. These devices worked better than using a solid pie tin, since they permit better escape of steam from the pie crust. However, they did not fully avoid buckling and gave rise to a new problem consisting of sticking of the pie shaper to the pie crust after cooking. Subsequent removal of the device, then, caused breaking of the pie crust.

Other pie shapers consisting of mesh wires were next attempted, as shown in U.S. Pat. Nos. 3,453,948 and 2,595,684. These devices also permitted the escape of steam, but suffer from the problems of sticking of the baked pie crust to the mesh wires, causing breaking of the crust upon removal. Additionally, these devices presented new problems in that they are hard to clean. Thus, the above devices are only partially successful in correcting the problems encountered in baking a single pie crust shell.

A further disadvantage of these devices is that they are only suitable for use in a specific sized pie tin. That is, they are not adaptable to different side wall heights, as well as different angled side walls, which variations are not uncommon in currently available pie tins.

SUMMARY OF THE INVENTION

It is now possible with the herein disclosed pie crust shaper to bake a single pie crust which is free of the common buckling, breaking, and other distortions which have been found with prior art devices and other methods of preventing such pie crust distortions. This is accomplished by means of a unique open work structure in the form of a central area having spokes radiating outwardly to a circumferential band. Attached in a rotatable manner to the outer band is a plurality of substantially A-shaped flaps which contact the side walls of the pie tin in a nesting fashion. The entire pie crust shaper is provided with a multiplicity of pricking elements so that the pie crust is pricked to allow escape of gases through the pie crust and through the pie crust shaper. An added advantage to these pricking elements is the fact that the pie crust shaper does not stick to the pie crust upon completion of the baking process. The provision of the rotatable flaps for contact with the side walls allows the pie crust shaper to be used in pie tins having varying angles of side walls as well as varying heights.

A central post with an attached ring is also provided for ease in removal of the pie shaper after its use. A further advantage includes the fact that the flaps fold inwardly for storage.

BRIEF DESCRIPTION OF THE DRAWINGS

The invention will be more clearly understood by reference to the description below taken in conjunction with the accompanying drawings wherein:

FIG. 1 shows a plan view of the pie crust shaper of the invention with the circumferential flaps folded inwardly as for storage;

FIG. 2 shows a fragmented cross section of the pie crust shaper nested on a pie crust in a pie tin during use;

FIG. 3 is an enlarged partially fragmented plan view of the pie crust shaper as shown in the direction 3—3 of FIG. 2;

FIG. 4 shows an enlarged view of the pricking elements as indicated in the direction 4 of FIG. 3;

FIG. 5 shows an enlarged cross section of a single pricking element as indicated at 5—5 of FIG. 4;

FIG. 6 shows a cross section taken in the direction 6—6 of FIG. 3 and shows one means for movable attachment of the flaps to the outer edge of the bottom of the pie crust shaper; and, FIG. 7 shows an alternate means of movable attachment of the flaps to the outer edge of the pie crust shaper bottom section.

FIG. 8 shows a cross-section similar to FIG. 5 except that a plastic material is shown in FIG. 8; and, FIG. 9 shows a cross-section similar to FIG. 5 except that a ceramic material is shown.

DESCRIPTION OF THE PREFERRED EMBODIMENTS

Referring now to FIG. 1, the pie crust shaper of the invention can be seen from a plan view. As shown, the flat bottom section 10 includes a central area 12 from which spokes 14 radiate to a concentric circumferential band 16. The bottom section 10 is of a size to fit into the bottom section of a pie tin in a nesting relationship.

Around the circumferential band 16 are a plurality of semicircular raised slots 18 made by forming or expand- A wire 20 as shown in detail in FIG. 6. parallel slits on the band 16 through the slots 18 around the band 16 and secured to itself. The wire 20 forms a base of attachment for the A-shaped flaps 22. These are rotatably attached to the wire 20 by means of crimped over areas 24 at their base. By means of the movable or rotatable attachment of the flaps 22, they can be folded inwardly for storage. In the same manner, extending the flaps 22 outwardly permits their use with pie tins having varying side wall angles and heights.

The flaps 22 can be secured to the outer peripheral band 16 of the bottom section of the pie crust shaper by the alternate embodiment shown in FIG. 7. Here, the flaps 33 have outwardly projecting tangs 36 on either side of the feet, which are inserted into the slots 18. This arrangement of the flaps 33 permits rotation of the flaps to a fully extended position, as well as a fully closed position. In the same manner as in FIG. 1, the flaps 33 because of their movable attachment, can be pressed against pie tins having side walls and varying heights angles. At the same time, they fold flat for storage.

The pie crust shaper as shown in FIG. 1 is in a closed configuration for storage with the flaps 22 folded inwardly. It can be seen that the spokes 14 as well as the flaps 22 contain punched out pricking elements 26 along surfaces thereof. The purpose of these pricking elements 26 is to prick the pie crust dough and provide slits for release of vapors and gases during cooking. At the same time, the pricking elements permit the easy removal of the pie crust shaper from the cooked pie crust upon completion of the cooking process. While only a portion of the pie crust shaper is shown with the pricking elements 26, this is only for purposes of convenience and is to be understood that the pricking elements are present throughout the entire pie crust shaper.

In order to provide ease in placement and removal of the pie crust shaper, a central ring 28 is provided. The ring 28 is attached to a post 30, which rises from the spoke 12 of the bottom section 10.

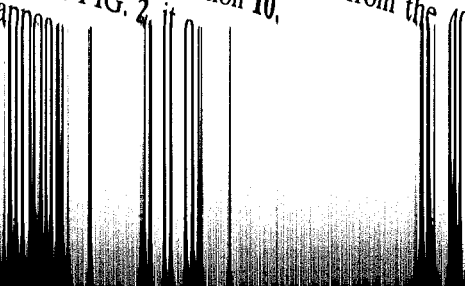

Referring now to FIG. 2, it appears...

above mentioned materials are intended to be illustrative of types of materials that can be used and are not intended to constitute limitation of the invention as described herein.

The pie crust shaper thus described combines an open network bottom section to which rotatable flaps are attached. The movable flaps permit use of the device with pie tins of varying side wall angles and heights. Furthermore, the movable flaps fold flat inwardly for storage.

Pricking elements throughout the pie crust shaper aid in release of gas from the pie crust dough during baking. At the same time, removal of the pie crust shaper after baking is made possible without sticking.

The central ring of the pie crust shaper provides an easy place for grasping the pie crust shaper during placement and removal during its use.

Various modifications of the above described invention are contemplated and can be resorted to by those skilled in the art without departing from the spirit and scope of the invention as defined by the following appended claims.

I claim:

1. A pie crust shaper for a bottom pie crust comprising:

a flat integrally formed open work bottom section having an outlying surrounding member conforming to the bottom of a pie pan;
a plurality of flaps movably fastened to said surrounding member; and,
wherein said bottom section and said flaps have a plurality of pricking elements to prick a pie crust upon contact.

2. A pie crust shaper as claimed in claim 1 wherein: said flaps are attached to a wire around said surrounding member.

3. A pie crust shaper as claimed in comprising:
a plurality a plurality of flat, substantially A shaped flaps movably fastened to said circumferential band; and, said bottom section and said flaps having a plurality of pricking elements to prick a pie crust upon contact.

11. A pie crust shaper as claimed in claim 10 further comprising:

a plurality of raised arcuate slots around said circumferential band;

a closed wire threaded through said slots around said band; and, the feet of said A shaped flaps being crimped around said wire loosely enough to allow rotation of said flaps.

* * * * *